US012762660B2

(12) United States Patent
Chaudhari et al.

(10) Patent No.: US 12,762,660 B2
(45) Date of Patent: Oct. 13, 2026

(54) SYSTEM AND METHOD FOR IMPLEMENTING AN EXPERIMENT REMOTELY AND DETERMINING AN OUTPUT USING A COMPUTER VISION MODEL

(71) Applicant: International Institute of Information Technology, Hyderabad, Hyderabad (IN)

(72) Inventors: Sachin Chaudhari, Hyderabad (IN); Venkatesh Choppella, Hyderabad (IN); Om Rajendra Kathalkar, Hyderabad (IN); Savitha Viswanadh Kandala, Hyderabad (IN); Nitin Nilesh, Hyderabad (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 421 days.

(21) Appl. No.: 18/241,852

(22) Filed: Sep. 2, 2023

(65) Prior Publication Data

US 2024/0078641 A1 Mar. 7, 2024

(30) Foreign Application Priority Data

Sep. 6, 2022 (IN) ............................. 202241050702

(51) Int. Cl.
*G06T 5/70* (2024.01)
*G06T 5/20* (2006.01)
(Continued)

(52) U.S. Cl.
CPC .................. *G06T 5/70* (2024.01); *G06T 5/20* (2013.01); *G06V 10/25* (2022.01); *G06V 10/44* (2022.01)

(58) Field of Classification Search
None
See application file for complete search history.

(56) References Cited

U.S. PATENT DOCUMENTS 11,195,274 B2 * 12/2021 Veidman ............. G06F 18/2415
2004/0029213 A1 * 2/2004 Callahan .................. G06T 7/44 382/128
(Continued)

FOREIGN PATENT DOCUMENTS

WO WO-2024160520 A1 * 8/2024 ........... H04L 63/105

OTHER PUBLICATIONS

Viswanadh et al., "CV and IoT-based Remote Triggered Labs: Use Case of Conservation of Mechanical Energy", 2022 9th International Conference on Future Internet of Things and Cloud (FiCloud), Aug. 22-24, 2022). (Year: 2022).*

*Primary Examiner* — Randolph I Chu

(57) ABSTRACT

A system and method for implementing an experiment remotely and determining an output using a computer-vision model is provided. The system includes an image capturing device, an experiment setup, a microcontroller, a user device, and a relay unit. The microcontroller (i) receives the input of the experiment from the image capturing device, (ii) extracts one or more frames from the input data, (iii) pre-process the one or more frames to obtain a binary image, (iv) obtain a closed curve around the binary image to locate the experiment, (v) determine the coordinates of the experiment to track the experiment in each frame, (vi) determine an output of the experiment from every two consecutive frames of the one or more frames, and (vii) optimize the determined output of the experiment using a linear regression model.

15 Claims, 11 Drawing Sheets

(51) Int. Cl.
*G06V 10/25* (2022.01)
*G06V 10/44* (2022.01)

(56) References Cited

U.S. PATENT DOCUMENTS

| | | | | |
|---|---|---|---|---|
| 2011/0216953 | A1* | 9/2011 | Callahan | C12Q 3/00 |
| | | | | 382/128 |
| 2020/0394499 | A1* | 12/2020 | Yao | G06N 3/0455 |
| 2022/0108505 | A1* | 4/2022 | Dhanuka | G06T 7/136 |
| 2022/0273907 | A1* | 9/2022 | Poltorak | G06F 3/015 |

* cited by examiner

SYSTEM AND METHOD FOR IMPLEMENTING AN EXPERIMENT REMOTELY AND DETERMINING AN OUTPUT USING A COMPUTER VISION MODEL

CROSS-REFERENCE TO RELATED APPLICATIONS

This patent application claims priority to Indian provisional patent application no. 202241050702 filed on Sep. 6, 2022, the complete disclosures of which, in their entirety, are hereby incorporated by reference.

FIELD OF THE INVENTION

The embodiments herein generally relate to implementing an experiment remotely, more particularly to a system and method for implementing an experiment remotely through a user device associated with a user and determining an output of the remote experiment using the computer vision model.

BACKGROUND

Many schools and colleges in developing countries, especially in rural areas, lack access to basic laboratory facilities. During COVID-19, this situation got worse and even the educational institutes having good experimental setups could not access their labs online. Remote triggered labs (RTL), which are IoT-based labs, can come in handy in such situations as the students can perform the experiments remotely on an actual experiment setup over an internet browser from anywhere in the world. The user can control input parameters for each experiment, and the corresponding outputs are returned to the dashboard. These outputs can be viewed from a browser on smart devices like laptops or smartphones. The results are visualized in plots and tables to make the observations conveniently and understand the experiment easily. These labs help gain hands-on experience critical to the learning and teaching process. They help students develop scientific reasoning abilities, understand the process of scientific investigation, and develop a broad understanding of scientific concepts. RTL can host a variety of experiments from different fields including Engineering, Physics, Chemistry, and Biology.

Existing Remote triggered labs (RTL) provide access to simulation-based experiments over the internet in various disciplines of science and engineering. However, these virtual labs face limitations with respect to measuring devices like sensors, where data collection can be limited by physical constraints like orientation, type, and number of sensors that can be placed. Further, publishing the experiment results and resetting the experiment is not automated or controlled remotely over the internet. The hardware components of the Remote triggered labs (RTL) are very bulky and of high cost. Further, the hardware components might require recalibrating as time progresses, and require frequent manual intervention.

Accordingly, there remains a need to address the aforementioned technical drawbacks in existing technologies for an automated system to perform an experiment remotely without physical constraints.

SUMMARY OF THE INVENTION

According to the first aspect, a system for implementing an experiment remotely and determining an output of the remote experiment using a computer vision model is provided. The system includes a user device configured to implement the experiment remotely by a user, an image capturing device configured to obtain input data comprising a video or an image of the experiment, a microcontroller configured to receive the input data of the experiment from the image capturing device through a network. The microcontroller is configured to (i) extract one or more frames from the input data of the experiment using a frame acquisition method, (ii) process the one or more frames to obtain a binary image of the experiment for each frame using a computer vision model, (iii) determine a closed curve around a boundary of the binary image of the experiment to highlight a region of interest for locating the experiment in each frame using a contour detection method, (iv) determine co-ordinates of the experiment by illustrating a bounding box over the experiment in each frame using the closed curve around the boundary of the binary image of the experiment, (v) determine an output of the experiment from every two consecutive frames of the one or more frames by the computer vision model that calculates (a) an euclidean distance between two consecutive centroids of the illustrated bounding box of the two consecutive frames and (b) a time difference between the two consecutive frames of centroids of the experiment.

In some embodiments, the microcontroller is configured to pre-process the one or more frames by (i) deducting a foreground image from each frame of the input data using background subtraction, (ii) closing small holes inside the foreground image of each frame to obtain a holes-free image using a morphological operation, (iii) removing noise of edges of the holes-free image of each frame to obtain a noise-free image using image filtering, and (iv) determining the binary image from the noise-free image using the image thresholding.

In some embodiments, the microcontroller is configured to determine a closed curve around the boundary of the binary image of the experiment by (i) detecting, using the contour detection method, contour points on the binary image in each frame and (ii) joining the contour points around the boundary of the binary image of the experiment in each frame.

In some embodiments, the microcontroller is configured to determine the co-ordinates of the experiment by calculating a height and a width of pixels of the closed curve of the binary image of each frame of the experiment using the computer vision model.

In some embodiments, the one or more frames of the input data of the experiment are in a range of 30 frames to 480 frames per second (FPS).

In some embodiments, the image capturing device is placed in a bird's eye view of a laboratory to capture the input data of the experiment.

In some embodiments, the microcontroller is configured to optimize the determined output of the experiment using a linear regression model. The linear regression model performs linear regression analysis on the determined output to improve the mean square error with respect to theoretical values.

According to the second aspect, a method for implementing an experiment remotely and determining an output of the remote experiment using a computer vision model is provided. The method includes (i) implementing the experiment remotely through a user device by a user, (ii) obtaining using an image capturing device, an input data of the experiment, the input data comprises a video or an image, (iii) extracting using a frame acquisition method, one or more frames from the input data of the experiment, (iv) processing the one or more frames to obtain a binary image of the experiment for each frame using a computer vision model, (v) determining a closed curve around a boundary of the binary image of the experiment to highlight a region of interest for locating the experiment in the each frame using a contour detection method, (vi) determining co-ordinates of the experiment by illustrating a bounding box over the experiment in each frame using the closed curve around the boundary of the binary image of the experiment, (vii) determining an output of the experiment from every two consecutive frames of the one or more frames by the computer vision model that calculates (a) an Euclidean distance between two consecutive centroids of the illustrated bounding box of the two consecutive frames and (b) a time difference between the two consecutive frames of centroids of the experiment, and (viii) optimizing the determined output of the experiment using a linear regression model.

In some embodiments, the method further comprises pre-processing the one or more frames by (i) deducting a foreground image from each frame of the input data using background subtraction, (ii) closing small holes inside the foreground image of each frame to obtain a holes-free image using a morphological operation, (iii) removing noise of edges of the holes-free image of each frame to obtain a noise-free image using image filtering, and (iv) determining the binary image from the noise-free image using image thresholding.

In some embodiments, the method further comprises detecting, using the contour detection method, contour points on the binary image in each frame; and joining the contour points around the boundary of the binary image of the experiment in each frame.

In some embodiments, the method further comprises determining the co-ordinates of the experiment by calculating a height and a width of pixels of the closed curve of the binary image of each frame of the experiment using the computer vision model.

In some embodiments, the one or more frames of the input data of the experiment are in a range of 30 frames to 480 frames per second (FPS).

In some embodiments, the image capturing device is placed in a bird's eye view of a laboratory to capture the input data of the experiment.

In some embodiments, the method further comprises optimizing the determined output of the experiment using a linear regression model. The linear regression model performs linear regression analysis on the determined output to improve the mean square error with respect to theoretical values.

The system of the present invention is helpful for students to work on laboratory experiments remotely from any location. The system can be run on microprocessors like a Raspberry Pi, so that the system reduces the cost of both hardware and software components, and the hardware components consume less space. The system does not require sensors for any measurement and calibration. The system measures and calibrates the output of experiments at different locations in the laboratory to improve the accuracy of the output. The system includes the linear regression model to reduce the error in the output of the experiments so that the output of the experiments is optimized.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
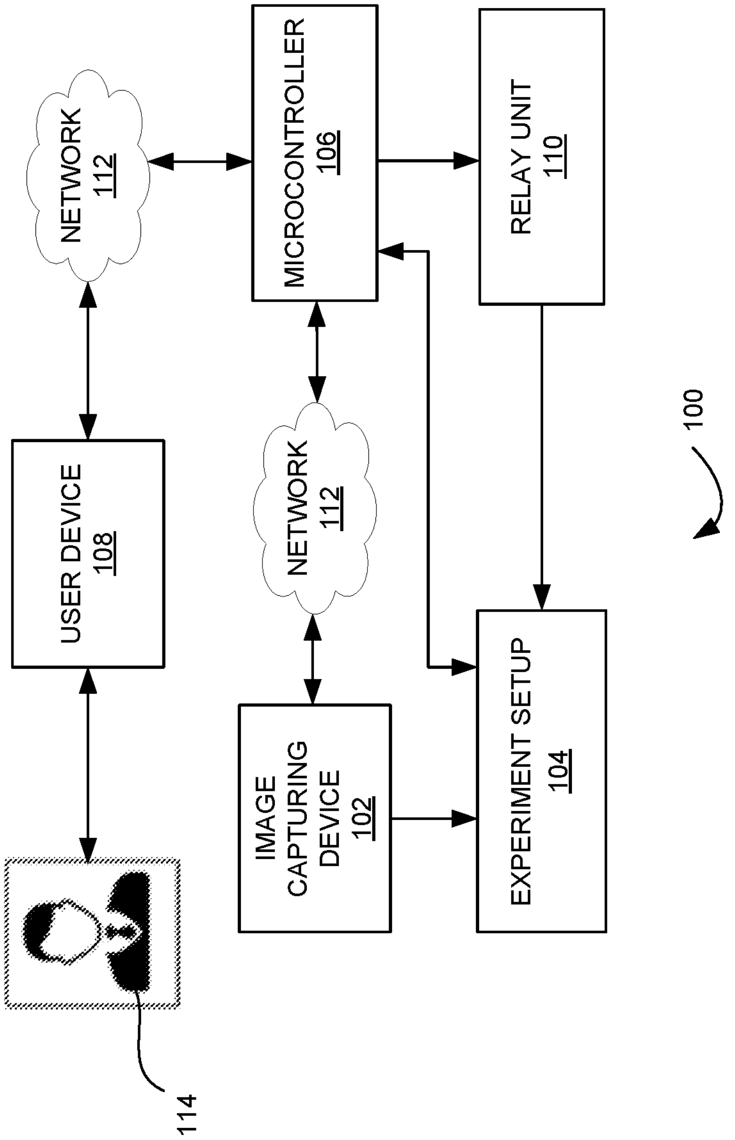
FIG. 1 is a system for implementing an experiment remotely and determining an output using a computer-vision model according to some embodiments herein.

The embodiments herein and the various features and advantageous details thereof are explained more fully with reference to the non-limiting embodiments that are illustrated in the accompanying drawings and detailed in the following description. Descriptions of well-known components and processing models are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an automated system to perform an experiment remotely and determining an output using a computer-vision model without physical constraints, referring now to the drawings, and more particularly to FIGS. 1 through 10, where similar reference characters denote corresponding features consistently throughout the figure's, preferred embodiments are shown.

FIG. 1 is a system for implementing an experiment remotely and determining an output using a computer-vision model according to some embodiments herein. The system 100 includes an image capturing device 102, an experiment setup 104, a microcontroller 106, a user device 108, a relay unit 110, and a network 112. A user 114 provides instructions to perform the experiment on the experiment setup 104 through the user device 108. The experiment setup 104 may include a plurality of hardware components with respect to the design of the experiment to be performed.

The user device 108 is communicatively connected with the microcontroller 106 through the network 112. The network 112 is a wireless network or wired network. The network 112 is a combination of a wired network and a wireless network. In some embodiments, network 112 is the Internet. The user device 108 may include a user interface to provide instructions to perform the experiment on the experiment setup 104.

The microcontroller 106 is configured to obtain the instructions of the user 114 from the user device 108 and operates the hardware components of the experiment setup 104 through the relay unit 110 facilitating the user 114 to perform the experiment remotely. The image capturing device 102 may include a virtual camera. The image capturing device 102 is placed in a position vertically above the experiment setup 104 to capture input data of the experiment in the experiment setup 104. The image capturing device 102 may include a video or an audio of the experiment performed in the experiment setup 104. The image capturing device 102 may be at least one of a camera, IR camera, thermal camera, night vision camera, optical sensor, mobile phone, Smartphone, or any kind of imaging device. The image capturing device 102 may be placed in a bird's eye view of the experiment setup 104 in a laboratory to capture the input data of the experiment. The image capturing device 102 is communicatively connected with the microcontroller 106 through the network 112.

The microcontroller 106 without limitation, is selected from a mobile phone, a Personal Digital Assistant (PDA), a tablet, a desktop computer, or a laptop. The microcontroller 106 includes a non-transitory computer-readable storage medium storing one or more sequences of instructions, which when executed causes the processing of the acquired input data of the experiment from the image capturing device 102 to determine the output of the experiment performed in the experiment setup 104. The user device 108 may be a hand-held device, a mobile phone, a Smartphone, a smart wearable device, a kindle, a PDA (Personal Digital Assistant), a tablet, a computer, or an electronic notebook.

The microcontroller 106 extracts one or more frames from the input data of the experiment using a frame acquisition method. The microcontroller 106 pre-processes the one or more frames to obtain a binary image of the experiment for each frame using a computer vision model. In some embodiments, the computer vision model (CV) includes background subtraction, morphological transformation, image filtering, image thresholding, and contour detection.

In some embodiments, the micro controller 106 pre-processes the one or more frames by (i) deducting a foreground image from each frame of an image of the input using the background subtraction, (ii) closing small holes inside the foreground image of each frame to obtain a holes-free image using the morphological operation, (iii) removing noise of edges of the holes-free image of each frame to obtain a noise-free image using the image filtering, and (iv) determine a binary image from the noise-free image using the image thresholding.

The microcontroller 106 determines a closed curve around a boundary of the binary image of the experiment for each frame of the input to highlight a region of interest for locating the experiment in each frame of the input data using a contour detection method.

The contour detection method detects contour points on the binary image of the experiment in each frame to obtain the closed curve around the binary of the experiment to highlight the region of interest on the binary image of the experiment using the computer vision model.

The closed curve is obtained by joining all contour points around the boundary of the binary image of the experiment for each frame of the input data.

The microcontroller 106 determines co-ordinates of the experiment by illustrating a bounding box over the experiment in each frame.

In some embodiments, the co-ordinates of the experiment are obtained by calculating a height and a width of the pixels of the closed curve of the binary image of each frame of the experiment using the computer vision model.

The microcontroller 106 determines an output of the experiment from every two consecutive frames of the one or more frames by calculating (i) an Euclidean distance between two consecutive centroids of the illustrated bounding box of the two consecutive frames and (ii) a time difference between the two consecutive frames of centroids of the experiment using the computer vision model.

In some embodiments, the Euclidean distance is converted to a real distance using a conversion factor ($d_w$). The Euclidean distance (in pixels) is the pixel distance between pixels of the centroids of the two consecutive frames of the experiment. For example, if ($x_1$,$y_1$) and ($x_2$, $y_2$) are coordinates of pixels of consecutive frames, then the Euclidean distance is calculated using the following equation, $$dp=\sqrt{(x2-x1)^2+(y2-y1)^2)}$$

The conversion factor ($d_w$) is a number used to change one set of measurement units to another set of measurement units by dividing or multiplying. For example, if the Euclidean distance (dp) is 18.897 pixels, then the real distance is calculated by, $$d=18.897/3.779=5\text{ mm}$$

Here, the pixel of the Euclidean distance is converted to milli-meters (mm), where 1 mm is equal to 3.779 pixels.

The output ($V_{est}$) of the experiment is determined between every two consecutive frames by, $$V_{est}=\frac{d}{t}=\frac{\text{distance}}{\text{time}}$$

$$t=\frac{1}{FPS}$$

In some embodiments, the one or more frames of the input data of the experiment are in a range of 30 to 480 frames per second (FPS).

In some embodiments, the microcontroller 106 employs a linear regression model to optimize the output of the computer vision model, thereby a variation in the optimized output and the determined output are determined from a ground truth value of the output to compute an accuracy of the experiment.

Figure 2:
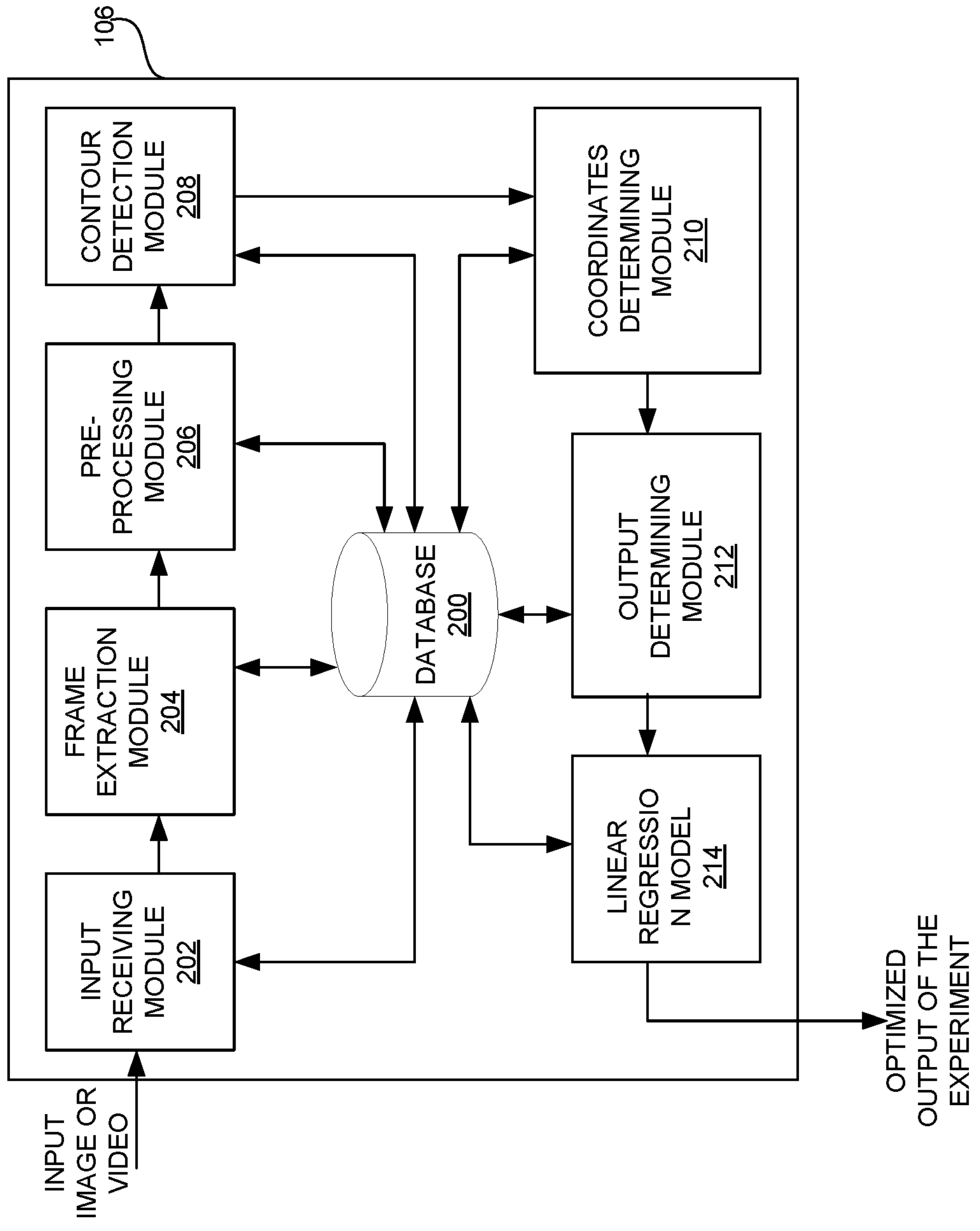
FIG. 2 illustrates a block diagram of the microcontroller of FIG. 1 according to some embodiments herein.

FIG. 2 illustrates a block diagram of the microcontroller of FIG. 1 according to some embodiments herein. The microcontroller 106 includes a database 200, an input receiving module 202, a frame extracting module 204, a pre-processing module 206, a contour detection module 208, a coordinate determining module 210, an output determining module 212, and a linear regression model 214. The database 200 may be communicatively connected with one or more modules of the microcontroller 106.

The input receiving module 202 receives the input data of the experiment performed on the experimental setup 104. The input data includes a video or an image. The database 200 stores the input data of the experiment. The frame extracting module 204 extracts one or more frames from the input data of the experiment. The pre-processing module 206 pre-processes the one or more frames to obtain a binary image of the experiment for each frame. The contour detection module 208 obtains a closed curve around a boundary of the binary image of the experiment for each frame of the input data to highlight a region of interest for locating the experiment in each frame of the input data using a contour detection method. The coordinates determining module 210 determines coordinates of the experiment by illustrating a bounding box over the experiment in each frame using the closed curve around a boundary of the binary image of the experiment. The output determining module 212 determines an output of the experiment from every two consecutive frames of the one or more frames by calculating (i) an Euclidean distance between two consecutive centroids of the illustrated bounding box of the two consecutive frames and (ii) a time difference between the two consecutive frames of centroids of the experiment using the computer vision model. The linear regression model 214 optimizes the output of the computer vision model to improve an accuracy of the output of the experiment.

Figure 3:
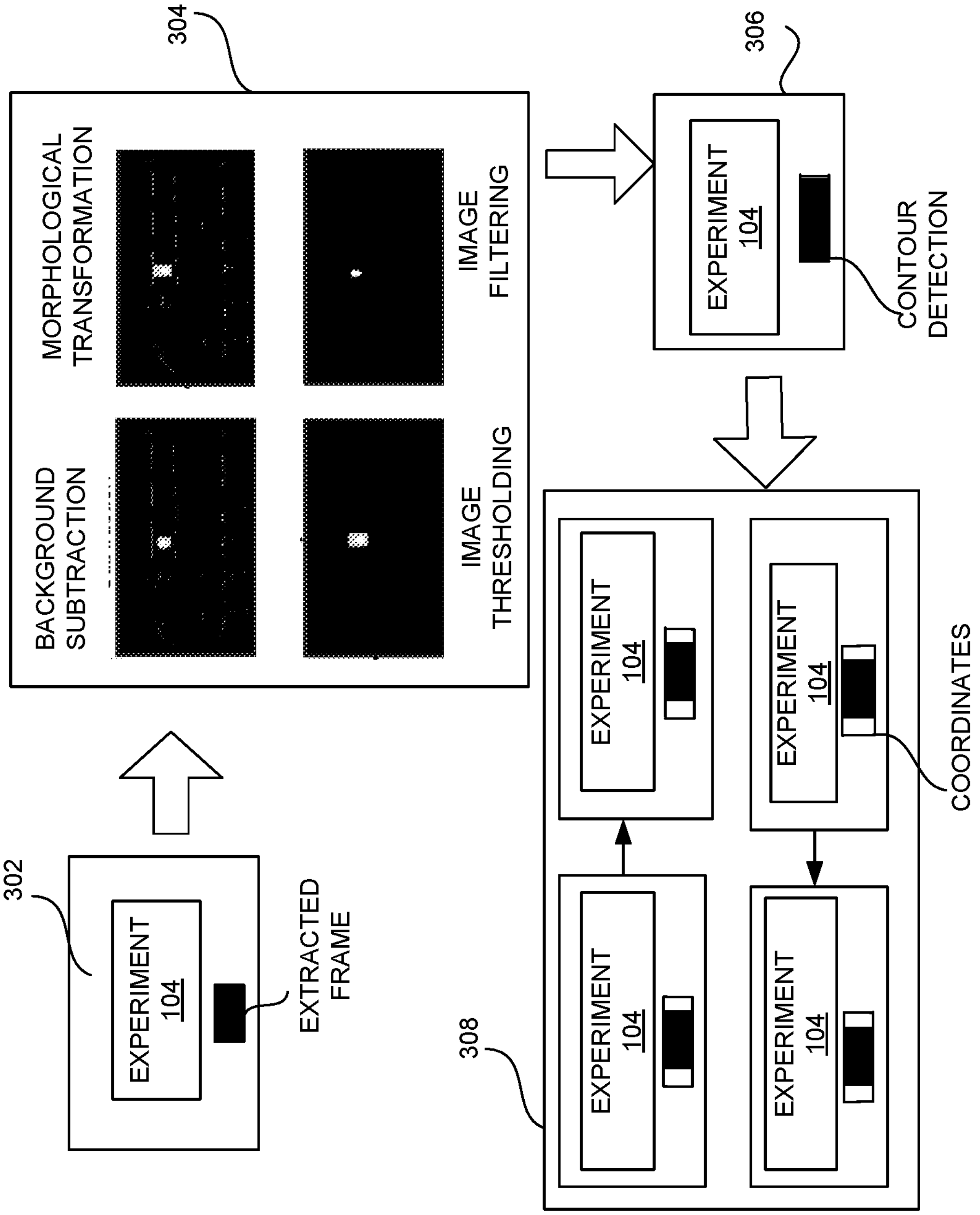
FIG. 3 is an exemplary view of computer vision-based processing of images or video of the experiment performed on the experiment setup of FIG. 1 according to some embodiments herein.

FIG. 3 is an exemplary view of computer vision-based processing of images or video of the experiment performed on the experiment setup of FIG. 1 according to some embodiments herein. At 302, the exemplary view depicts the extraction of one or more frames of the experiment. At 304, the exemplary view depicts pre-processing of the one or more frames that are extracted. At 306, the exemplary view depicts a closed curve around a boundary of the experiment by contour detection. At 308, the exemplary view depicts co-ordinates of the experiment by illustrating a bounding box over the experiment in each frame.

Figure 4:
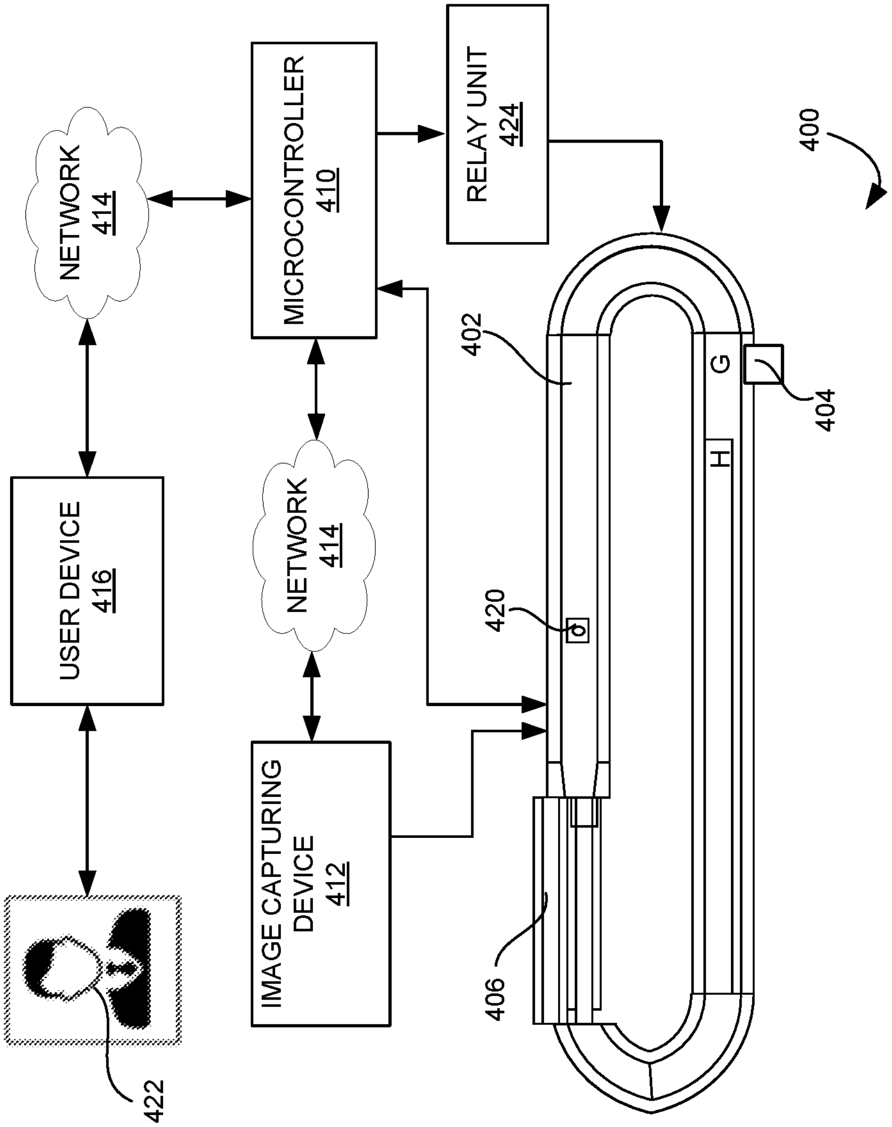
FIG. 4 illustrates an experimental setup for determining a velocity of an object according to some embodiments herein.

FIG. 4 illustrates an experimental setup for determining a velocity of an object according to some embodiments herein. The experimental setup 400 includes a three dimensional (3D) track 402, a motor unit comprising a micro-servo motor 404, an escalator 406, a DC motor 408 (not shown in FIG. 4), a microcontroller 410, an image capturing device 412, a network 414, a user device 416, and the object 420.

The microcontroller 410 controls the operations of the micro-servo motor 404, the escalator 406, and the DC motor 408 through a relay unit 424. A user performs the experiment remotely by providing input data through the user device 416. The user device 416 may include a user interface to obtain the input data from the user 422 to perform the experiment. The microcontroller 410 may be a Raspberry Pi 3B+.

The 3D track 402 is designed using Fusion 360 and printed with white poly-lactic acid (PLA) material. All the dimensions and coordinates of the points on 3D track 402 are predetermined. The 3D track 402 comprises a continuous track of two gradually varying slopes along which the escalator 406 and the DC motor 408 are placed. The object 420 is a stainless steel ball of diameter 18.5 mm and mass 500 grams. The object 420 is set to roll on the 3D track 402. The escalator 406 operated by the DC motor 408 forms a closed path in the 3D track 402 by raising the object 420 to the top position. The micro-servo motor 404 acts as a gate to bring the object 420 to a halt and release it from rest later. This gate can be controlled by the user 422 remotely via the user device 416 through an interface. Point "H" denotes the point where the velocity estimation starts and point "G" is the release point of the object 420. The image capturing device 412 record at 30 FPS and is fixed vertically above the 3D track 402 to obtain a video of the experiment. The image capturing device 412 is fixed such that the whole 3D track 402 is captured while the experiment is performed. The image capturing device 412 is a Raspberry Pi camera. All the hardware components are hidden and covered with the background to avoid visual disturbances during recordings of the experiment as that might affect the velocity estimations. The image capturing device 412 supports up to 40 Frame per second (FPS) with full Field of Vision (FoV). A mobile camera may be used to record the 3D track 402 at higher frame rates of 60, 240 and 480 FPS to analyse the effect of change of FPS on the results. The mobile camera can be replaced with an USB camera that supports higher FPS and can be attached to the 3D track 402.

To compute the velocity of the object 420, the microcontroller 410 employs a computer vision model. The microcontroller 410 is configured to extract one or more frames from the video or the image captured by the image capturing device 412 sequentially. The extracted frames are stored in the memory for further processing. The microcontroller 410 pre-processes the extracted frames by performing i) background subtraction, ii) morphological operation, iii) image filtering, and iv) image thresholding. The microcontroller 410 localizes the moving object 420, which is a part of the image foreground. The background is subtracted from the image to get the foreground which mainly contains the object 420 due to its motion. After getting the foreground image that still comprise noise, morphological operations are used to remove these noises. This method helps to close small holes inside the foreground objects in the frame. The closing morphology method comprises of repeated steps of dilation followed by erosion. The image filtering processes the edges using a median filter to remove the noise. Finally, the image thresholding process is applied after converting the image into grayscale. As a result, frames are converted into a binary image, and a closed curve is formed around the object 420. The image thresholding process may include median thresholding (threshold value set to 127) to create blobs for the later stage of inspection. The pre-processed frame is used to localize the object 420. The closed curves formed around the object 420 are used to determine the location of the object 420. The contours are defined simply as a curve joining all the consecutive points along the object's boundary. In the experiment, the curves are formed around the object 420, i.e., steel ball, and finding the contours will provide the object's location. As the contour's location is determined in coordinates, a bounding box is drawn to highlight the region of interest, i.e., the localised object 420, and the centroid of the bounding box is stored. After determining the location of the object 420 in one particular frame, the same process is applied to all the consecutive frames. In each frame, the location of the object 420 is determined and tracked further.

The microcontroller 410 estimates the velocity of the object 420 between 2 frames based on the frames captured from the image capturing device 412, coordinates of the object's centroid for each frame tracked earlier, a conversion factor ($d_w$) to convert pixel distance to real-life distance (specific for a given track) and the frame rate of the input video (lines 2~6). Every two consecutive frames are considered and the Euclidean distance between their centroids is calculated (lines 10~11). Then the velocity of the moving object is estimated (lines 12~14) using the time taken to travel between two consecutive frames. The computer vision model may use an open-source computer vision library for image segmentation, object detection, and object tracking.

In some embodiments, the 3D track 402 is provided with a plurality of IR sensors to calculate the velocity in a Region of Interest (RoI), where the average velocity is approximated as the object's instantaneous velocity. The RoI is a small rectangular region (<8 $cm^2$) in front of the IR sensor where the sensor can detect the presence of the object 420. A timer is started when the object passes through an RoI and is incremented till the object leaves the RoI. Let Δt be the total increments of the timer. The estimated velocity of the object 420 using IR setup ($V_{IR}$) is $V_{IR}$=0.0185/Δt, where the distance covered by the object 420 will be equal to the diameter of the object 420, i.e., 0.0185 m.

TABLE 1

| Region | $V_{T\ (m/s)}$ | MSE for $V_{IR}$ | MSE for $V_{IR,\ fit}$ | MSE for $V_{CV}$ | MSE for $V_{cv,\ fit}$ |
|---|---|---|---|---|---|
| 1 | 0.25 | 0.0002 | 0.0001 | 0.0004 | 0.00005 |
| 2 | 0.32 | 0.0008 | 0.0007 | 0.0007 | 0.00008 |
| 3 | 0.40 | 0.0027 | 0.0013 | 0.0017 | 0.00015 |
| 4 | 0.48 | 0.0030 | 0.0019 | 0.0022 | 0.00023 |
| 5 | 0.59 | 0.0034 | 0.0024 | 0.0031 | 0.00031 |

The Table 1 shows the comparison of computer vision-based and IR-based implementations for calculating the velocity of the object 420. The Table 1 shows the mean square error (MSE) for velocities estimated using computer vision (CV) (i.e., $V_{CV}$ and $V_{CV,\ fit}$) and sensor-based (i.e., $V_{IR}$ and $V_{IR,fit}$) implementations with respect to theoretical velocity ($V_T$) where $V_{IR,fit}$ is the line of best fit for velocities estimated using the IR-based implementation. Here, $N_{disc}$=5 discontinuous regions are chosen for the IR-based implementation. While using the CV-based implementation, velocities are estimated for N=50 and velocities of all the data points lying in each of the $N_{disc}$ regions are averaged for comparison purpose. It can be observed that the MSE increases with height due to obvious reasons in both cases. Also, line fitting improves the MSE for both implementations. However, the best MSE values were obtained for $V_{CV,fit}$ that is almost 10 times better showing that the CV implementation can be used instead of IR-based implementation. Also, the number of data points can be increased as the FPS of the recorded video is increased, allowing monitoring changes happening at multiple points along the 3D track 402. However, this is not possible with sensor-based implementations as the number of sensors that can be placed is constrained by the length of the track (a maximum of 12 IR sensors can be placed for this track).

Figure 5:
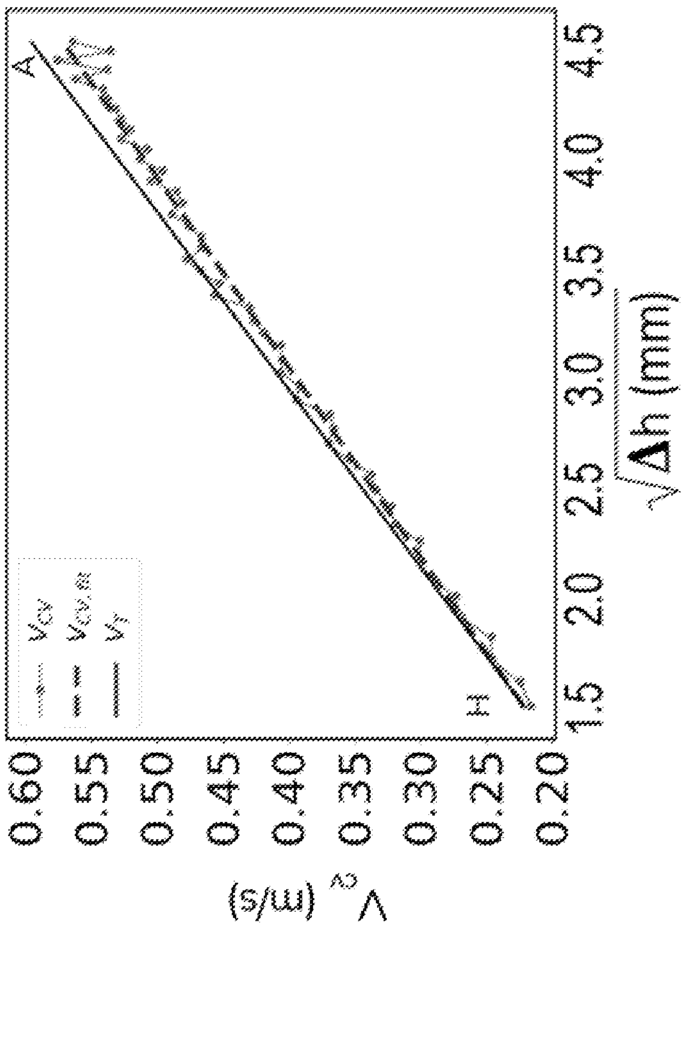
FIG. 5 is a graph that illustrates theoretical velocities $V_T$ and estimated velocities using the computer vision model ($V_{CV}$ and $V_{CV, fit}$) of the object of FIG. 4 according to some embodiments herein.

FIG. 5 is a graph that illustrates theoretical velocities $V_T$ and estimated velocities using the computer vision model ($V_{CV}$ and $V_{CV,\ fit}$) of the object of FIG. 4 according to some embodiments herein. The graph illustrates theoretical velocities $V_T$ and estimated velocities using CV ($V_{CV}$ and $V_{CV,\ fit}$) at different points on the 3D track 402 as a function of square-root of difference of height of the object 420 (i.e., √Δh). The curves are very close and the velocities increase as Δh increases. The second observation is that the error at various data points is fluctuating. To improve the estimated values at individual data points, the line of best fit using linear regression $V_{CV,fit}$ is used.

Figure 6:
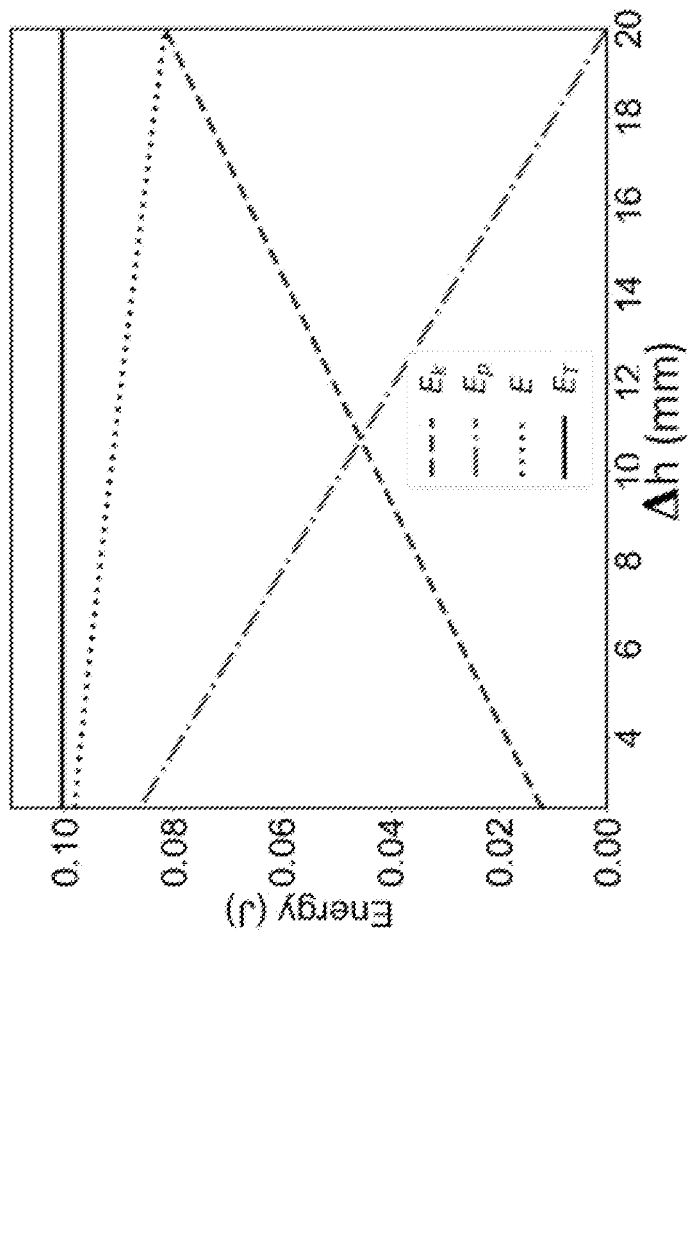
FIG. 6 is a graph that illustrates the corresponding plot of $E_k$, $E_p$, $E_T$, and the calculated mechanical energy (E) versus $\Delta h$ of the object of FIG. 4 according to some embodiments herein.

FIG. 6 is a graph that illustrates corresponding plot of $E_k$, $E_p$, $E_T$ and the calculated mechanical energy (E) v Δh of the object of FIG. 4 according to some embodiments herein. The mechanical energy of the object 420 ($E_T$) is the sum of kinetic energy of the object 420 ($E_k$) and potential energy of the object 420 ($E_p$). $E_k$ is estimated using $v_{CV,fit}$. $E_k$ is non-zero at point H as velocity is not estimated from the release point of the object 420, i.e, point G. Secondly, E deviates slightly from $E_T$ and this happens due to friction and measurement errors.

Figure 7A:
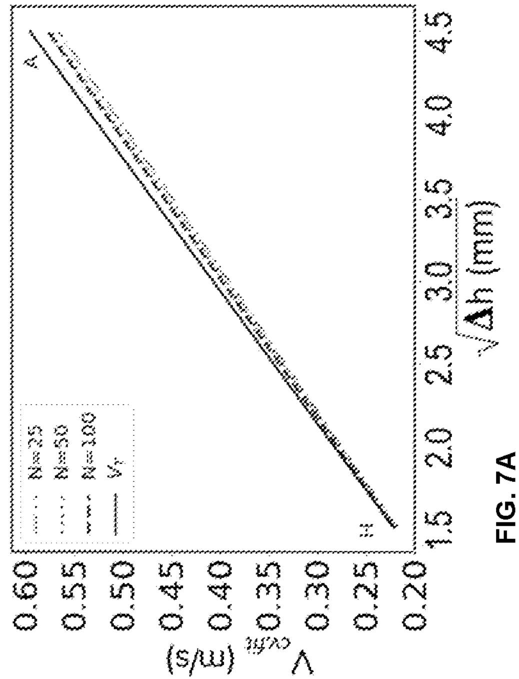
FIGS. 7A and 7B are graphs that show the line of best fits and mean square errors (MSE) with respect to the square-root of the difference of height of the object $\sqrt{\Delta h}$ for N=25, 50, and 100 according to some embodiments herein.
Figure 7B:
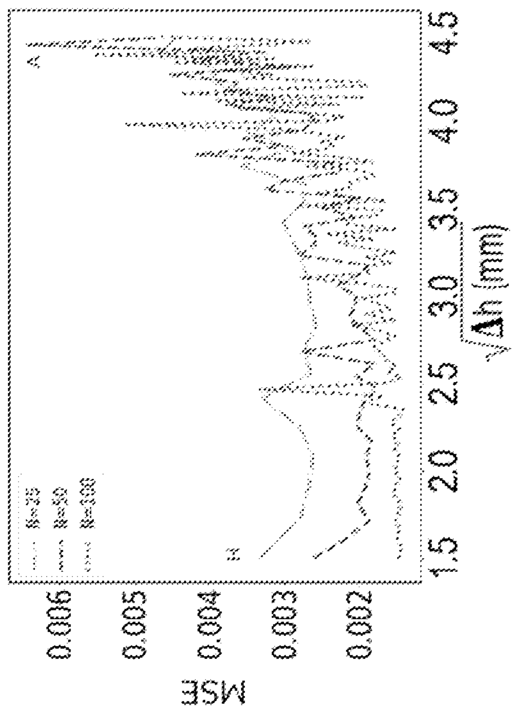

FIGS. 7A and 7B are graphs that show the line of best fits and mean square errors (MSE) with respect to the square-root of the difference of height of the object √Δh for N=25, 50, and 100 according to some embodiments herein. FIG. 7A is a graph of $V_{cv,\ fit}$ Vs √Δh for FPS=480. FIG. 7B is a graph of MSE $_{Vs}$ √Δh for FPS=480. The line of best fit comes closer to the theoretical value as N increases. However, the change from N=50 to N=100 is very small indicating that the line of best fit obtained is nearly optimal and the remaining bias is mainly due to friction. In FIG. 7B, MSE for N=50 and N=100 are very similar and lower compared to N=25.

Figure 8:
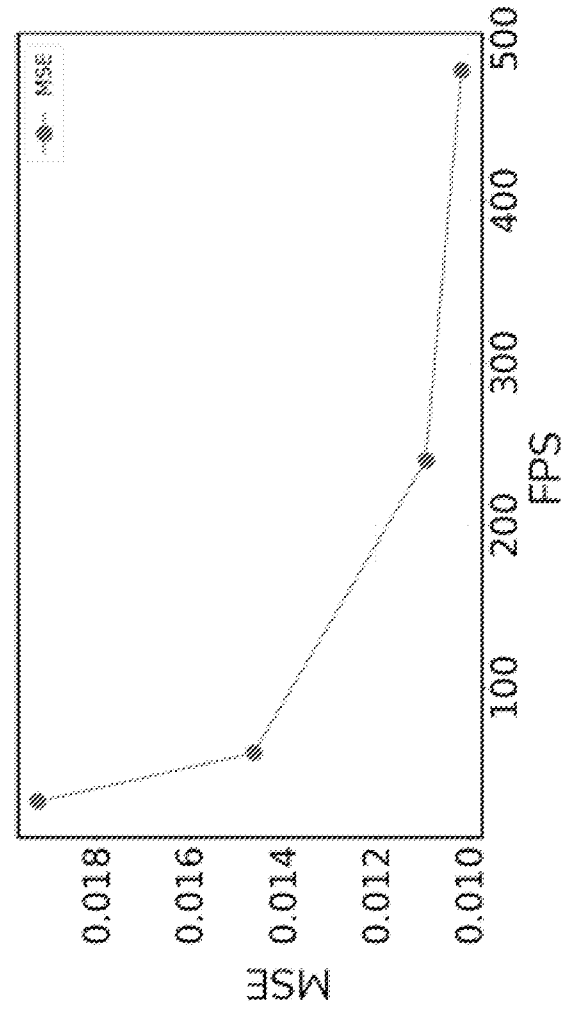
FIG. 8 is a graph that illustrates the mean square error for $V_{CV}$ with respect to $V_T$ for N=10 and FPS=30, 60, 240, and 480 according to some embodiments herein.

FIG. 8 is a graph that illustrates MSE for $V_{CV}$ with respect to $V_T$ for N=10 and FPS=30, 60, 240, and 480 according to some embodiments herein. The low value of N is chosen to gather sufficient frames when FPS=30. It is observed that the MSE reduces as the FPS values of the recorded video increase. Secondly, it is observed that the drop in MSE decreases as FPS increases from 30 to 480 FPS. There is no significant reduction in MSE for videos recorded above 240 FPS.

Figure 9A:
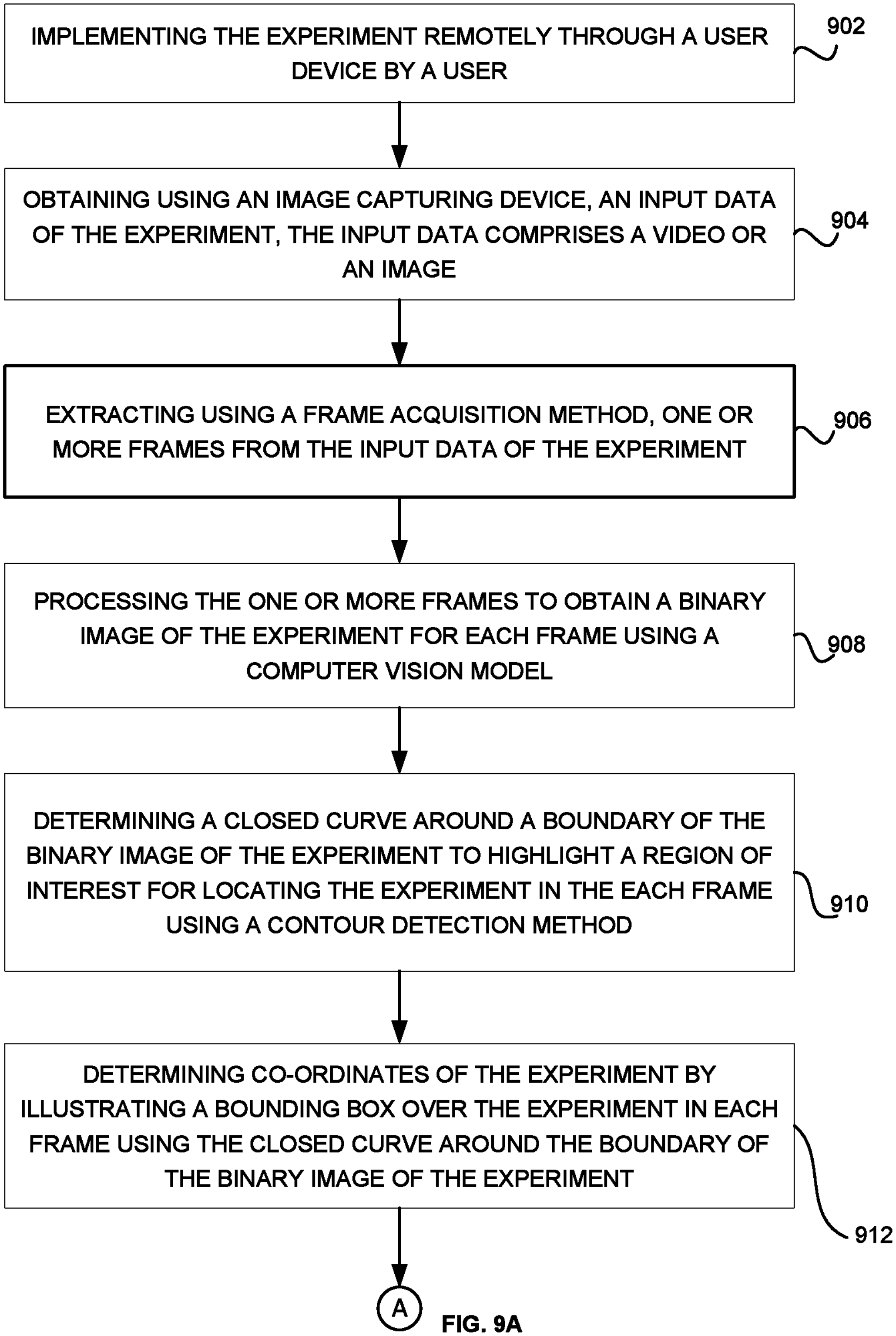
FIGS. 9A and 9B are flow diagrams that illustrate a method for implementing an experiment remotely and determining an output using a computer-vision model according to some embodiments herein.
Figure 9B:
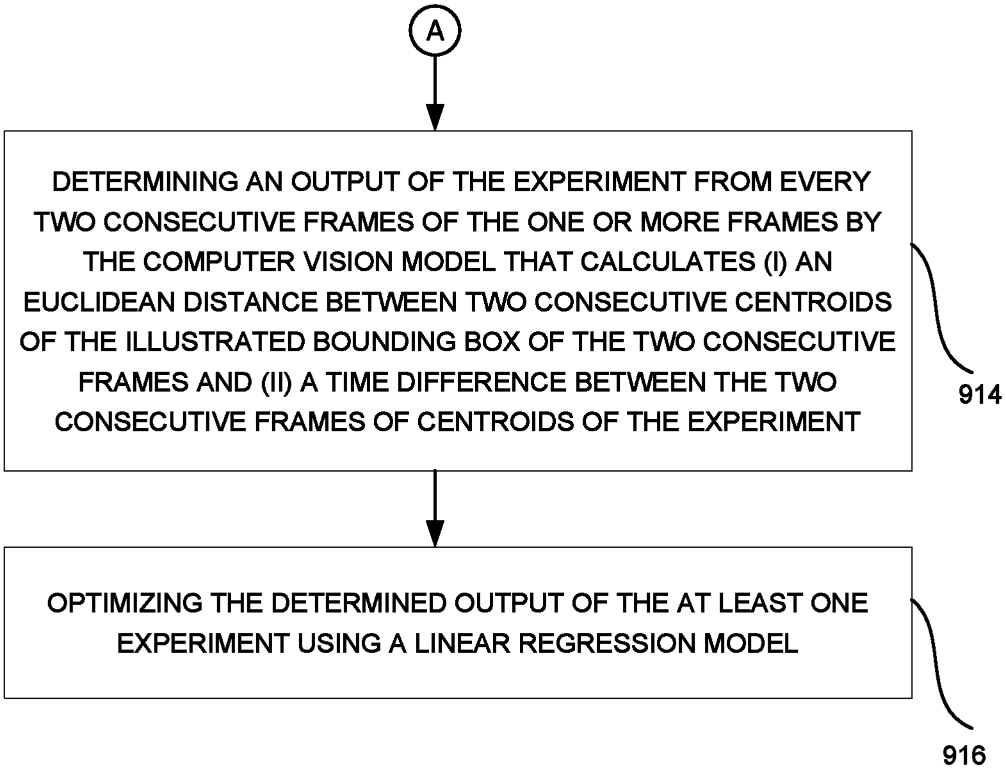

FIGS. 9A-9B are flow diagrams that illustrate a method for implementing an experiment remotely and determining an output using computer-vision model according to some embodiments herein. At step 902, the method includes, implementing the experiment remotely through a user device by a user. At step 904, the method includes obtaining using an image capturing device, an input data of the experiment. The input data comprises a video or an image. At step 906, the method includes, extracting using a frame acquisition method, one or more frames from the input data of the experiment. At step 908, the method includes, processing the one or more frames to obtain a binary image of the experiment for each frame using a computer vision model. At step 910, the method includes, determining a closed curve around a boundary of the binary image of the experiment to highlight a region of interest for locating the experiment in each frame using a contour detection method. At step 912, the method includes, determining co-ordinates of the experiment by illustrating a bounding box over the experiment in each frame using the closed curve around the boundary of the binary image of the experiment. At step 914, the method includes determining an output of the experiment from every two consecutive frames of the one or more frames by the computer vision model that calculates (i) an euclidean distance between two consecutive centroids of the illustrated bounding box of the two consecutive frames and (ii) a time difference between the two consecutive frames of centroids of the experiment. At step 916, the method includes optimizing the determined output of the experiment using a linear regression model.

Figure 10:
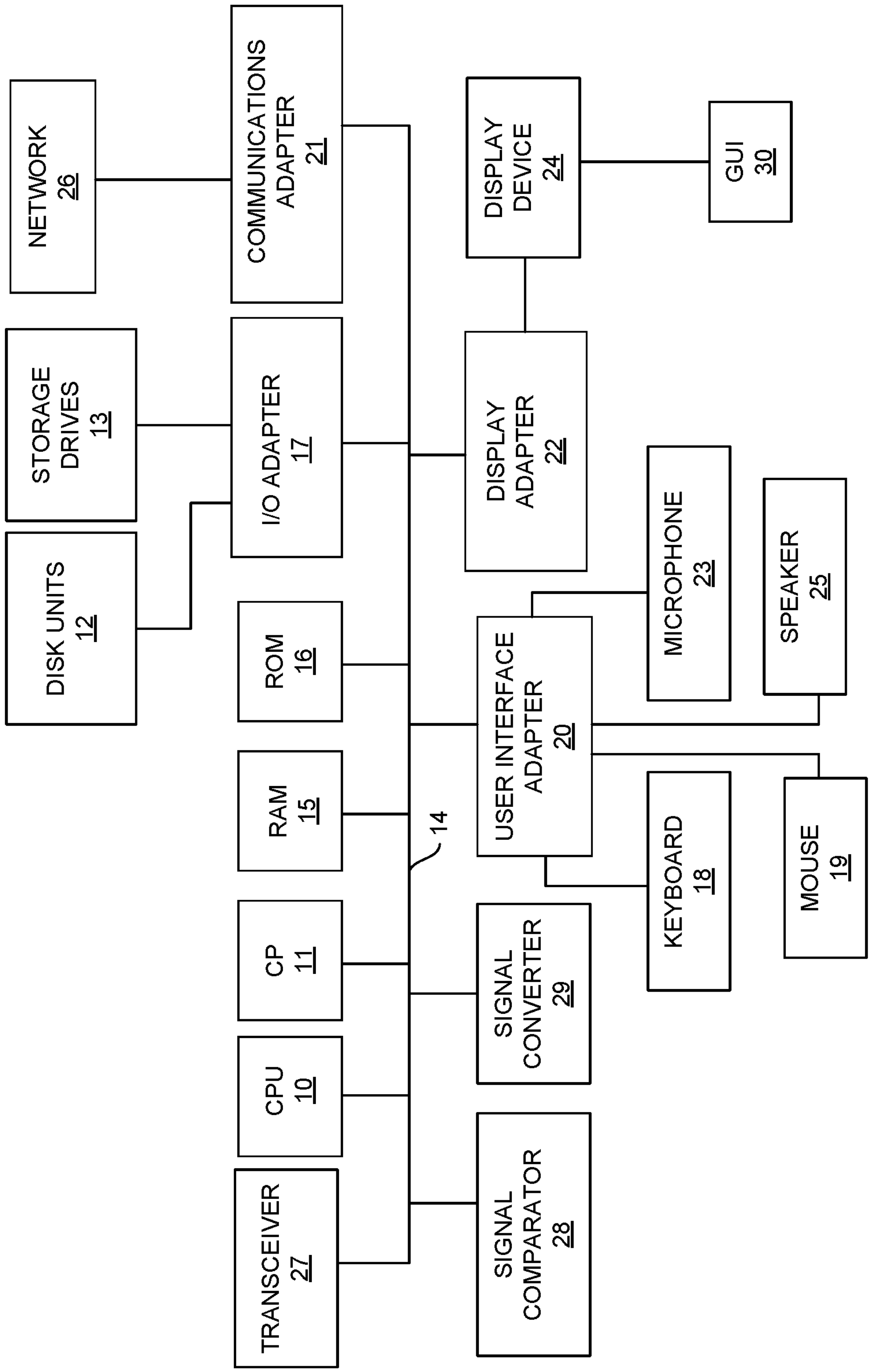
FIG. 10 is a schematic diagram of a computer architecture in accordance with the embodiments herein.

A representative hardware environment for practicing the embodiments herein is depicted in FIG. 10, with reference to FIGS. 1 through 9A-9B. This schematic drawing illustrates a hardware configuration of a microcontroller 106/computer system/computing device in accordance with the embodiments herein. The system includes at least one processing device CPU 10 that may be interconnected via system bus 14 to various devices such as a random-access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A system for implementing an experiment remotely and determining an output of the experiment using a computer vision model, wherein the system comprises:
- a user device configured to implement the experiment remotely by a user;
- an image capturing device configured to obtain input data of the experiment, wherein the input data comprises a video or an image;
- a microcontroller configured to receive the input data of the experiment from the image capturing device through a network, wherein the microcontroller is configured to,
  - extract one or more frames from the input data of the experiment using a frame acquisition method;
  - process the one or more frames to obtain a binary image of the experiment for each frame using the computer vision model;
  - determine a closed curve around a boundary of the binary image of the experiment to highlight a region of interest for locating the experiment in each frame using a contour detection method;
  - determine co-ordinates of the experiment by illustrating a bounding box over the experiment in each frame using the closed curve around the boundary of the binary image of the experiment;
  - determine an output of the experiment from every two consecutive frames of the one or more frames by the computer vision model that calculates (i) an euclidean distance between two consecutive centroids of the illustrated bounding box of the two consecutive frames and (ii) a time difference between the two consecutive frames of centroids of the experiment.

2. The system of claim 1, wherein the microcontroller is configured to pre-process the one or more frames by (i) deducting a foreground image from each frame of the input data using background subtraction, (ii) closing small holes inside the foreground image of each frame to obtain a holes-free image using a morphological operation, (iii) removing noise of edges of the holes-free image of each frame to obtain a noise-free image using image filtering, and (iv) determining the binary image from the noise-free image using the image thresholding.

3. The system of claim 1, wherein the microcontroller is configured to determine a closed curve around the boundary of the binary image of the experiment by (i) detecting, using the contour detection method, contour points on the binary image in each frame, and (ii) joining the contour points around the boundary of the binary image of the experiment in each frame.

4. The system of claim 1, wherein the microcontroller is configured to determine the co-ordinates of the experiment by calculating a height and a width of pixels of the closed curve of the binary image of each frame of the experiment using the computer vision model.

5. The system of claim 1, wherein the one or more frames of the input data of the experiment are in a range of 30 frames to 480 frames per second (FPS).

6. The system of claim 1, wherein the image capturing device is placed in a bird's eye view of a laboratory to capture the input data of the experiment.

7. The system of claim 1, wherein the microcontroller is configured to optimize the determined output of the experiment using a linear regression model, wherein the linear regression model performs linear regression analysis on the determined output to improve the mean square error with respect to theoretical values.

8. A method for implementing an experiment remotely and determining an output of the experiment using a computer vision model, wherein the method comprising:
- implementing the experiment remotely through a user device by a user;
- obtaining using an image capturing device, an input data of the experiment, wherein the input data comprises a video or an image;
- extracting using a frame acquisition method, one or more frames from the input data of the experiment;
- processing the one or more frames to obtain a binary image of the experiment for each frame using a computer vision model;
- determining a closed curve around a boundary of the binary image of the experiment to highlight a region of interest for locating the experiment in each frame using a contour detection method;
- determining co-ordinates of the experiment by illustrating a bounding box over the experiment in each frame using the closed curve around the boundary of the binary image of the experiment; and
- determining an output of the experiment from every two consecutive frames of the one or more frames by the computer vision model that calculates (i) an Euclidean distance between two consecutive centroids of the illustrated bounding box of the two consecutive frames and (ii) a time difference between the two consecutive frames of centroids of the experiment.

9. The method of claim 8, wherein the method further comprises pre-processing the one or more frames by (i) deducting a foreground image from each frame of the input data using background subtraction, (ii) closing small holes inside the foreground image of each frame to obtain a holes-free image using a morphological operation, (iii) removing noise of edges of the holes-free image of each frame to obtain a noise-free image using image filtering, and (iv) determining the binary image from the noise-free image using image thresholding.

10. The method of claim 8, wherein the method further comprises, detecting, using the contour detection method, contour points on the binary image in each frame; and joining the contour points around the boundary of the binary image of the experiment in each frame.

11. The method of claim 8, wherein the method further comprises determining the co-ordinates of the experiment by calculating a height and a width of pixels of the closed curve of the binary image of each frame of the experiment using the computer vision model.

12. The method of claim 8, wherein the one or more frames of the input data of the experiment are in a range of 30 frames to 480 frames per second (FPS).

13. The method of claim 8, wherein the image capturing device is placed in a bird's eye view of a laboratory to capture the input data of the experiment.

14. The method of claim 8, wherein the method further comprises optimizing the determined output of the experiment using a linear regression model, wherein the linear regression model performs linear regression analysis on the determined output to improve the mean square error with respect to theoretical values.

15. One or more non-transitory computer readable storage mediums storing one or more sequences of instructions, which when executed by one or more processors, causes a method for implementing an experiment remotely and determining an output of the experiment using a computer vision model, wherein the method comprising:

implementing the experiment remotely through a user device by a user;

obtaining using an image capturing device, an input data of the experiment, wherein the input data comprises a video or an image;

extracting using a frame acquisition method, one or more frames from the input data of the experiment;

processing the one or more frames to obtain a binary image of the experiment for each frame using a computer vision model;

determining a closed curve around a boundary of the binary image of the experiment to highlight a region of interest for locating the experiment in each frame using a contour detection method;

determining co-ordinates of the experiment by illustrating a bounding box over the experiment in each frame using the closed curve around the boundary of the binary image of the experiment; and determining an output of the experiment from every two consecutive frames of the one or more frames by the computer vision model that calculates (i) an Euclidean distance between two consecutive centroids of the illustrated bounding box of the two consecutive frames and (ii) a time difference between the two consecutive frames of centroids of the experiment.

* * * * *